(12) United States Patent  (10) Patent No.: US 7,841,781 B2
Wang  (45) Date of Patent: Nov. 30, 2010

(54) METHODS AND APPARATUSES FOR PROVIDING A HERMETIC SEALING SYSTEM FOR AN OPTICAL TRANSCEIVER MODULE

(75) Inventor: Tak K. Wang, Saratoga, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 632 days.

(21) Appl. No.: 11/846,861

(22) Filed: Aug. 29, 2007

(65) Prior Publication Data

US 2009/0060518 A1 Mar. 5, 2009

(51) Int. Cl.
*G02B 6/36* (2006.01)
*H04B 10/00* (2006.01)
*H01L 21/00* (2006.01)
*H01R 9/00* (2006.01)

(52) U.S. Cl. ............................. 385/94; 385/92; 385/14; 385/52; 398/135; 438/26; 438/27; 29/842; 29/843

(58) Field of Classification Search .................. 385/14, 385/88, 89, 92, 93, 94, 52; 398/134, 135, 398/136, 137, 138, 139; 438/26, 27, 64, 438/65; 29/842, 843, 592.1
See application file for complete search history.

(56) References Cited

U.S. PATENT DOCUMENTS

| 6,331,678 | B1 | 12/2001 | Wang et al. ................. 174/253 |
| 7,359,642 | B2* | 4/2008 | Richardson et al. ......... 398/135 |
| 7,654,752 | B2* | 2/2010 | Rosenberg .................... 385/93 |
| 2002/0114592 | A1* | 8/2002 | Case et al. .................... 385/91 |
| 2004/0021217 | A1* | 2/2004 | Epitaux et al. ............... 257/700 |
| 2005/0058411 | A1* | 3/2005 | Finot et al. .................... 385/94 |
| 2005/0105907 | A1* | 5/2005 | Richardson et al. ........... 398/79 |
| 2008/0013959 | A1* | 1/2008 | Ishigami ..................... 398/135 |
| 2009/0060518 | A1* | 3/2009 | Wang ......................... 398/135 |

* cited by examiner

*Primary Examiner*—Brian M Healy

(57) ABSTRACT

In an optical transceiver module, the bottom surface of the lid is temporarily attached to the top surface of the submount assembly in a pre-alignment position prior to performing the solder flowing process in order to prevent the lid from shifting position during the solder flowing process. The solder flowing process is then performed to melt the solder. When the solder melts, the surface tension of the melted solder pulls the lid into its ultimate, or permanent, aligned position. The solder is then cooled, causing it to harden, thereby securing the lid to the submount assembly in its ultimate, permanently aligned position. The hardened solder between the top surface of the submount assembly and the bottom surface of the lid forms a hermetic seal that encloses components on the transmit side of the transceiver module in a hermetically-sealed environment.

16 Claims, 9 Drawing Sheets

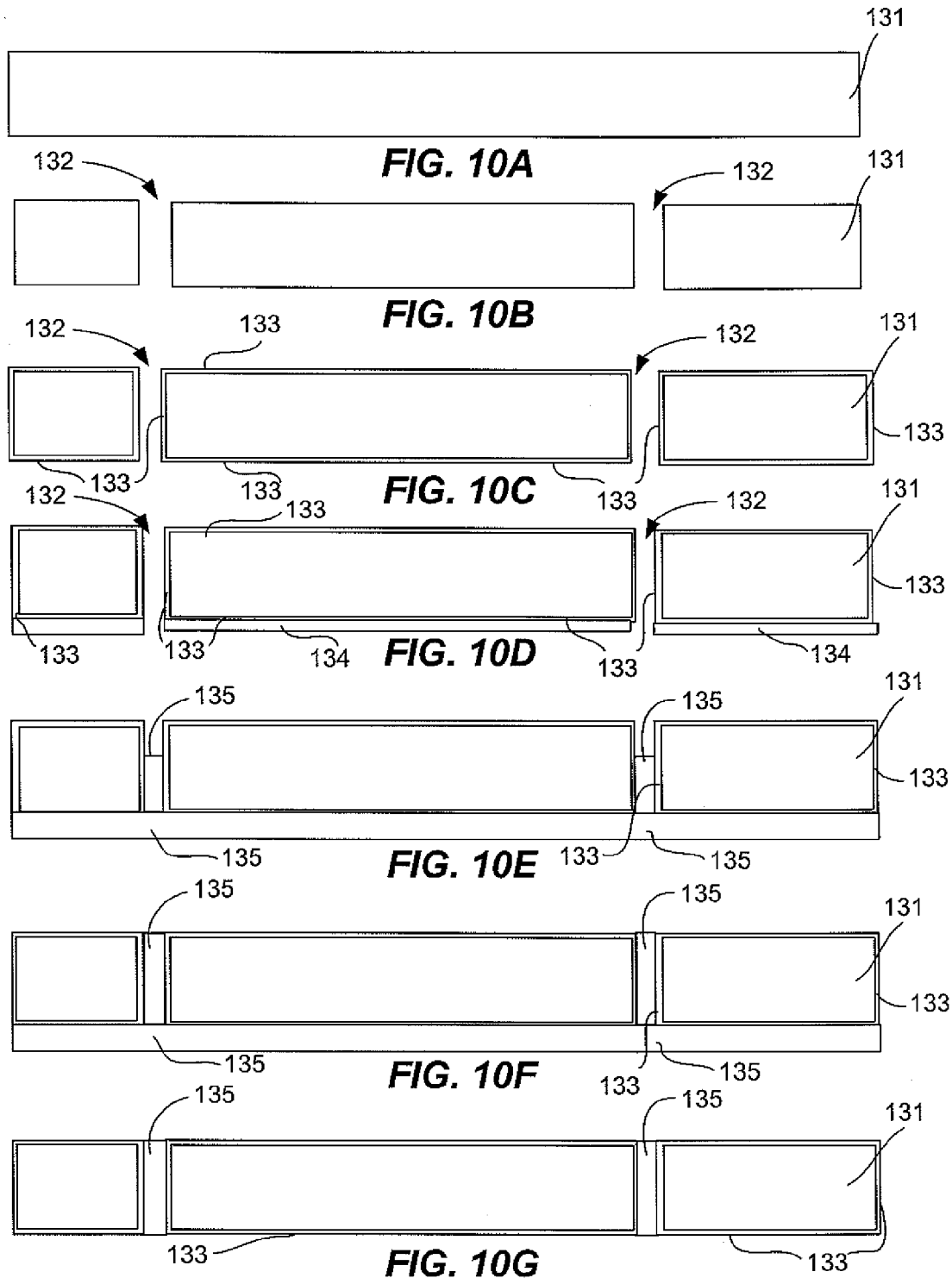

METHODS AND APPARATUSES FOR PROVIDING A HERMETIC SEALING SYSTEM FOR AN OPTICAL TRANSCEIVER MODULE

TECHNICAL FIELD OF THE INVENTION

The invention relates to optical transceiver modules. More particularly, the invention relates to hermetically sealing components in an optical transceiver module to protect them from the environment.

BACKGROUND OF THE INVENTION

In optical communications networks, optical transceiver modules are used to transmit and receive optical signals over optical fibers. On the transmit side of the transceiver module, a laser generates amplitude modulated optical signals that represent data, which are then transmitted over an optical fiber coupled to the transceiver module. Various types of semiconductor lasers are typically used for this purpose, including, for example, Vertical Cavity Surface Emitting Lasers (VCSELs) and edge emitting lasers, which may be further divided into subtypes that include Fabry Perot (FP) and Distributed Feedback (DFB) lasers.

On the receive side of the transceiver module, an optics system of the module focuses light propagating out of the end of an optical fiber onto an optical detector, which converts the optical energy into electrical energy. The optical detector is typically a semiconductor photodiode device, such as a PIN photodiode, for example. Optical transceiver modules typically include one or more laser diodes on the transmit side for transmitting multiple data signals and one or more photodiodes on the receive side for receiving multiple data signals.

In some cases, apparatuses known as transistor outline (TO) cans are used to hermetically package components of optical transceiver modules. The laser diodes, photodiodes and other components are first attached by epoxy or gold-tin eutectic alloys to a header of a receptacle of the transceiver module. The components are then wire bonded to the traces of a printed circuit board (PCB), which functions as the subassembly of the transceiver module. A lid having a transparent window in it is then welded to the header in such a way that the lid encompasses the components on the header in a hermetically-sealed environment. In other cases, the components are placed in a ceramic package and then the package is hermetically sealed by either welding a metalized area of the package to a metal foil, or by glass frit bonding the package to a glass window. While these methods and apparatuses generally provide satisfactory results, they are often costly.

FIG. 1 illustrates a block diagram of the transmit side of a known optical transceiver module 2 having components that are enclosed in a hermetically-sealed environment. The portion of the optical transceiver module shown is typically referred to as a transistor outline (TO)-can transmitter module. The TO-can module comprises a submount assembly 3, a pedestal 4, a laser diode 5 mounted on the pedestal 4, a TO-can lid 6, a lens 7 formed in the lid 6, and electrical leads 8 for providing power and ground and electrical signals between the IC comprising the laser diode 5 and possibly other electrical components housed in the TO-can module, such as one or more photodiodes (not shown) and optical elements (not shown). Typically, one or more optical elements (e.g., lenses, reflectors, etc.) are mounted to the submount assembly 3 for directing light output from the laser diode 5 onto the lens 7, and possibly onto other light-sensitive elements, such as a monitoring photodiode (not shown). The submount assembly 3 is typically made of silicon or of a ceramic material.

The process for attaching the components shown in FIG. 1 and for hermetically sealing them within the lid 6 is as follows. The laser diode 5 and any other components to be placed in a hermetically sealed enclosure (e.g., photodiodes, thermistors, etc.) are attached to the top surface 9 of the submount assembly 3 using a gold-tin die attach process. The optical components such as any lenses or reflectors (not shown) are attached to the top surface 9 of the submount assembly 3 with non-electrically conducting epoxies. Electrical components such as thermistors (not shown) and decoupling capacitors (not shown) are attached to the top surface 9 of the submount assembly 3 using a conductive epoxy.

To provide a hermetic seal for this enclosure, a solder ring disposed on the bottom surface of the lid 6 is welded to the top surface 9 of the submount assembly 3 during a solder flowing process. When the solder is cooled, it hardens, fixing the lid 6 in place and forming a hermetic seal between the bottom surface of the lid 6 and the top surface 9 of the submount assembly 3.

Although this hermetic seal normally works well, a few problems may occur. First of all, there is no mechanism for holding the lid 6 in place during the reflow process. Consequently, a small vibration may cause the lid 6 to shift in position, resulting in non-wetting of the top surface 9 of the submount assembly 3 by the solder disposed on the bottom surface of the lid 6. This may result in the seal failing. Second, a shift in the position of the lid 6 may result in the lid 6 damaging wire bonds on the submount assembly 3, which may result in components not operating properly. Furthermore, the lid attachment temperature is limited on the upper and lower ends of a temperature range, which can result in other difficulties that must be addressed. On the upper end, the attachment temperature is bounded by the melting temperature of the gold-tin eutectic and by the degradation temperature of epoxy. On the lower end, the attachment temperature is bounded by the melting point of the flex circuit attachment. Having to work within these bounds can result in the occurrence of other problems.

Accordingly, a need exists for ways to hermetically seal the components of the optical transceiver module within a hermetically-sealed environment that are relatively inexpensive, that ensure that the lid is positioned to achieve adequate wetting of the lid and submount assembly with solder, and that ensure that the lid is held in place during the reflow process so that it cannot shift in position.

SUMMARY OF THE INVENTION

The present invention provides an optical transceiver module with a hermetically-sealed enclosure and a method for providing a hermetically-sealed enclosure for components of the optical transceiver module. The optical transceiver module comprises a submount assembly having a top surface and a bottom surface, a lid having a top surface, a bottom surface, an exterior surface, and an interior surface defining a cavity in the lid, and a hermetic sealing system. The cavity formed in the lid provides space for one or more components such that when the bottom surface of the lid is attached to the top surface of the submount assembly, the component or components are enclosed within the cavity formed in the lid.

The hermetic sealing system includes at least one temporary attachment/pre-alignment sealing element disposed on the bottom surface of the lid and at least one permanent attachment/alignment sealing element disposed on the bottom surface of the lid. The hermetic sealing system includes at least one temporary attachment/pre-alignment sealing element disposed on the top surface of the submount assembly and at least one permanent attachment/alignment sealing element disposed on the top surface of the submount assembly. The temporary attachment/pre-alignment sealing elements disposed on the bottom surface of the lid and on the top surface of the submount assembly come into contact with each other during a temporary attachment and pre-alignment process during which the lid is temporarily attached to and pre-aligned with the submount assembly. The permanent attachment/alignment sealing elements disposed on the bottom surface of the lid and on the top surface of the submount assembly come into contact with each other during a permanent attachment and alignment process during which the lid is permanently aligned with and permanently attached to the submount assembly.

The invention also provides one or more methods providing a hermetically-sealed enclosure for components of the optical transceiver module. In accordance with an embodiment, the method comprises providing a lid having at least one surface on which one or more elements of a hermetic sealing system are disposed, providing a submount assembly having at least one surface on which one or more elements of the hermetic sealing system are disposed, temporarily attaching the lid to the submount assembly in a pre-alignment position by placing at least one of the elements of the hermetic sealing system disposed on the lid in contact with at least one of the elements of the hermetic sealing system disposed on the submount assembly to temporarily attach the lid to the submount assembly and to pre-align the lid with the submount assembly, and permanently attaching the lid to the submount assembly in a permanent alignment position such that a hermetic seal is formed between the bottom surface of the lid and the top surface of the submount assembly.

The invention also provides a method for preventing cracks from occurring in a dielectric layer of a submount assembly. This method comprises placing a first dielectric layer on a submount assembly substrate, forming a patterned metal layer on the first dielectric layer such that edges of the patterned metal layer are tapered, and covering the patterned metal layer having the tapered edges with a second dielectric layer. The tapered edges of the patterned metal layer prevent cracks from occurring in the second dielectric layer at locations at which the second dielectric layer covers the tapered edges of the patterned metal layer.

These and other features and advantages of the invention will become apparent from the following description, drawings and claims.

BRIEF DESCRIPTION OF THE DRAWINGS

FIGS. 10A-10G illustrate cross-sectional views of a wafer in which vias are formed to allow electrical connections to be made to components within the hermetically-sealed enclosure without having to pass conductors beneath the annular sealing ring disposed on the submount assembly.

DETAILED DESCRIPTION OF ILLUSTRATIVE EMBODIMENTS

In accordance with embodiments of the invention, the bottom surface of the lid is temporarily attached to the top surface of the submount assembly in a pre-alignment position prior to performing the solder flowing process in order to prevent the lid from shifting position during the solder flowing process. The solder flowing process is then performed to melt the solder. When the solder melts, the surface tension of the melted solder pulls the lid into its ultimate, or permanent, aligned position. The solder is then cooled, causing it to harden, thereby securing the lid to the submount assembly in its ultimate, permanently aligned position. The hardened solder between the top surface of the submount assembly and the bottom surface of the lid forms a hermetic seal that encloses components on the transmit side of the transceiver module in a hermetically-sealed environment. After the hermetic seal has been formed, an attachment material such as epoxy may be used to secure the lid to the submount assembly to ensure that the lid and the submount assembly do not move relative to each other, thereby ensuring that the integrity of the hermetic seal will remain high. Various embodiments for providing these features will now be described below with reference to FIGS. 2-10G.

Figure 1:
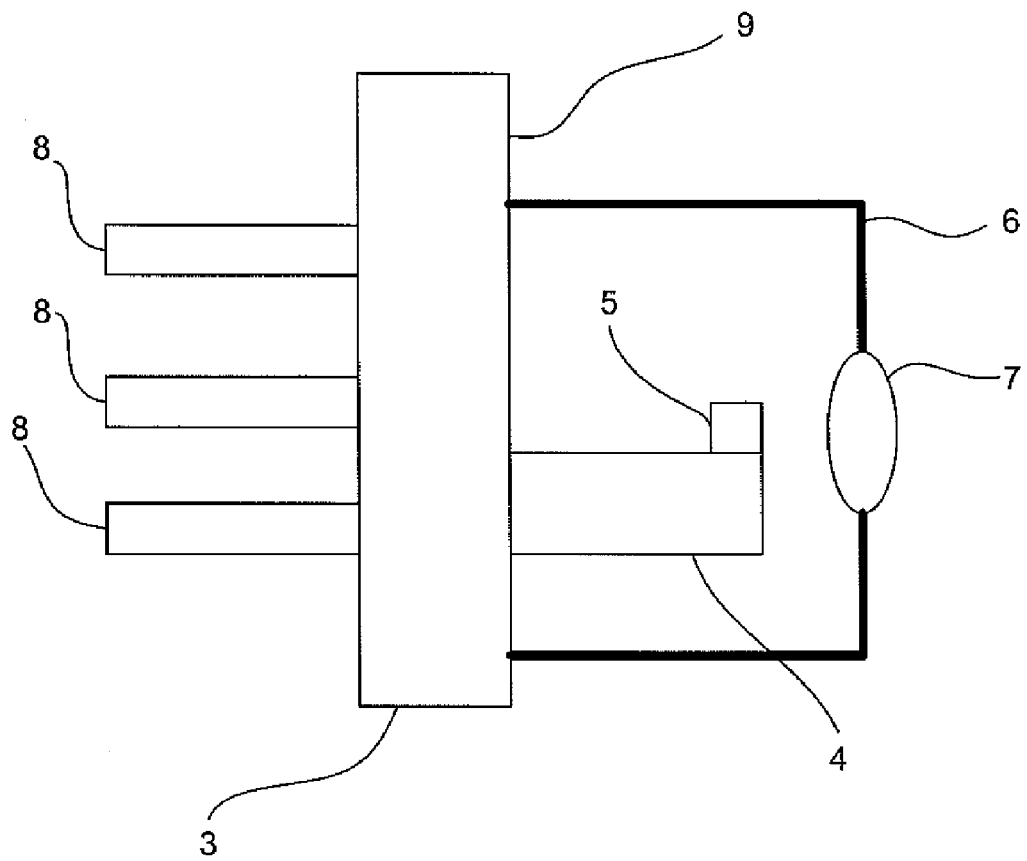
FIG. 1 illustrates a block diagram of components of the transmit side of a known optical transceiver module that are enclosed in a hermetically-sealed environment.
Figure 2:
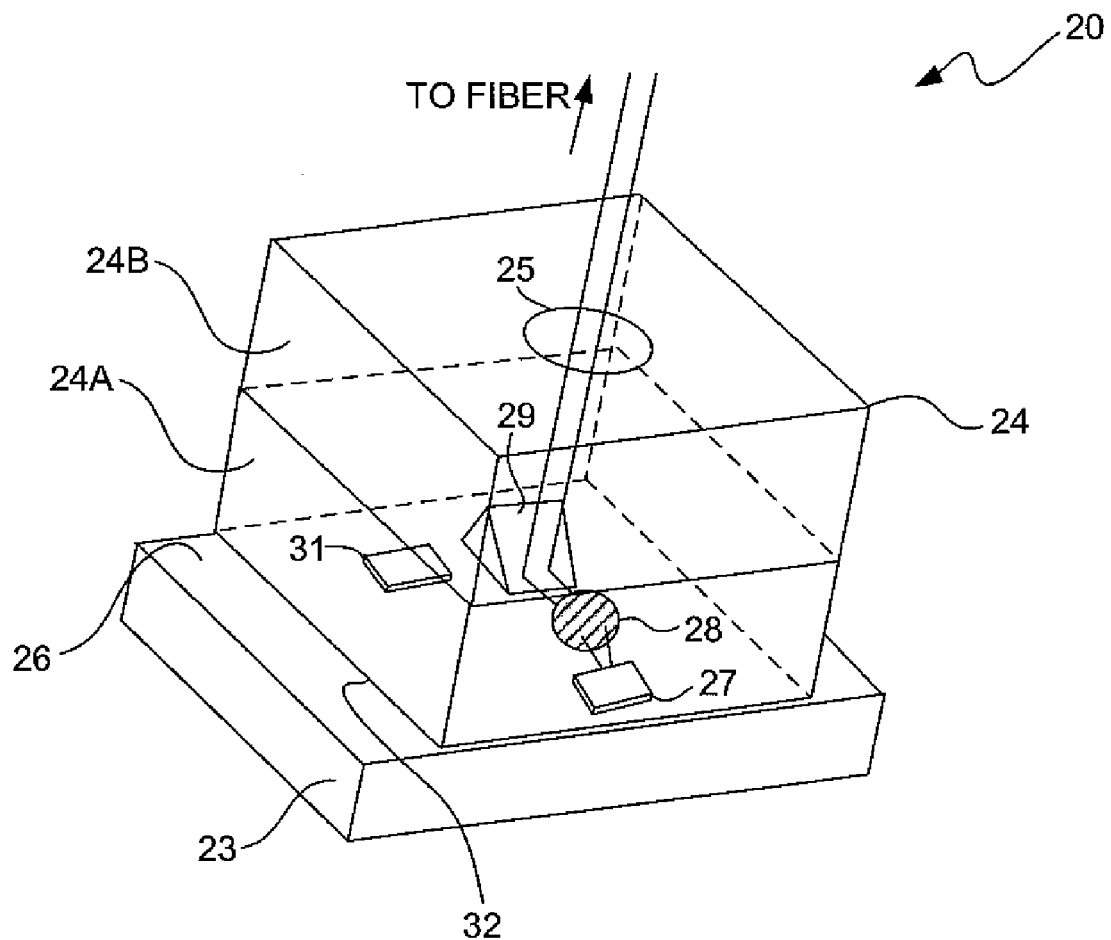
FIG. 2 illustrates a block diagram of the transmit side of an optical transceiver module in accordance with an embodiment having components that are enclosed in a hermetically-sealed environment.

FIG. 2 illustrates a block diagram of the transmit side of an optical transceiver module 20 in accordance with an illustrative embodiment. The optical transceiver module 20 shown in FIG. 2 comprises a submount assembly 23 and a lid 24. The lid 24 comprises a lower lid portion 24A and an upper lid portion 24B. The upper lid portion 24B has a lens 25 formed in a top surface thereof. Components of the transceiver module 20 such as, for example, a laser diode 27, a ball lens 28, a 45° mirror 29, and a photodiode 31 are attached to an upper surface 26 of the submount assembly 23, which is typically made of silicon or of a ceramic material. The ball lens 28, the 45° mirror 29 and the lens 25 together comprise the optics system of the transceiver module 20. It should be noted that the optical transceiver module 20 may have additional components and/or components that are different from those shown in FIG. 2. The components 27-31 are shown only for the purpose of providing an example of components that are typically incorporated into the transmit side of an optical transceiver module. As persons skilled in the art will understand, optical transceiver modules can have a wide variety of configurations.

The term "optical transceiver module" is used herein to denote a transceiver module that produces optical signals that represent data and transmits them over an optical waveguide from the module and that receives optical signals that represent data that have been transmitted to the optical transceiver module over an optical waveguide. Many of the operations that occur within the module are operations that are performed on electrical signals in the electrical domain. Therefore, the term "optical transceiver module" is not intended to be limited to transceiver modules in which operations are performed exclusively in the optical domain, although the invention would apply equally to such transceiver modules. Also, the term "optical transceiver module", as that term is used herein, is intended to include modules that only include either the transmitter portion or the receiver portion of a transceiver module.

The process for attaching the components shown in FIG. 2 is typically as follows. A large number of submount assemblies are formed on a single silicon wafer. The submount assemblies are then singulated into individual submount assemblies. Each submount assembly is then populated with components 27-31. To populate the submount assembly with these components, the laser diode 27 and photodiode 31 are typically attached to the top surface 26 of the submount assembly 23 using a gold-tin eutectic die attach process. The optical components such as the ball lens 28 and the mirror 29 are typically attached to the top surface 26 of the submount assembly 23 using non-electrically conducting epoxies. Electrical components such as thermistors (not shown) and decoupling capacitors (not shown) are typically attached to the top surface 26 of the submount assembly 23 using a conductive epoxy. A wire bonding process is then performed to wire bond leads (not shown) of these components to traces (not shown) of the submount assembly 23.

After the wire bonding process has been performed, the lid 24 is temporarily attached to the submount assembly 23 in a pre-alignment position to prevent the lid 24 from shifting position during the subsequent solder flowing process. This temporary attachment/pre-alignment step can be achieved in a plurality of ways, as will be described below in detail. The solder flowing process is then performed, during which solder on the bottom surface of the lower lid portion 24A melts and comes into contact with metal on the top surface 26 of the submount assembly 23. The surface tension of the molten solder causes the lid to shift into its ultimate, permanently aligned position. It is possible that the temporary pre-alignment position coincides with the permanent alignment position. The solder is then cooled to harden it, which causes the metal on the top surface of the submount assembly 23 to become permanently joined to the hardened solder. These joined materials forms a permanent hermetic seal, represented by reference numeral 32, between the bottom surface of the lower lid portion 24A and the top surface 26 of the submount assembly 23, thereby enclosing the components 27-31 in a hermetically-sealed environment.

Although the lid 24 has a lower lid portion 24A and an upper portion 24B, these portions are normally integrally formed during a manufacturing process during which many lids are formed on a silicon wafer and then singulated into individual lenses. In accordance with an embodiment, the lower lid portion 24A is made of glass (e.g., Pyrex® glass) and the upper lid portion 24B is made of silicon. The choice of material for the lower and upper lid portions 24A and 24B depends on the wavelength of interest in a given technological application. In accordance with this embodiment, silicon is used for the upper lid portion 24B because silicon is transparent to the wavelength of interest and because it is easier to form the lens 25 in silicon than it is to form it in glass. The invention, however, is not limited with respect to the composition, shape or configuration of the lid 24, as will be understood by those skilled in the art in view of the description provided herein.

Figure 3:
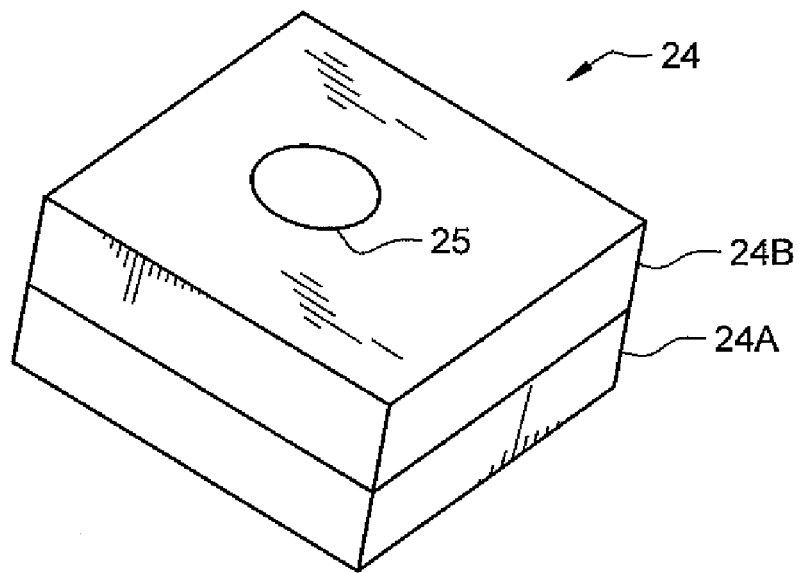
FIG. 3 illustrates a top perspective view of the lid of the optical transceiver module shown in FIG. 2.
Figure 4:
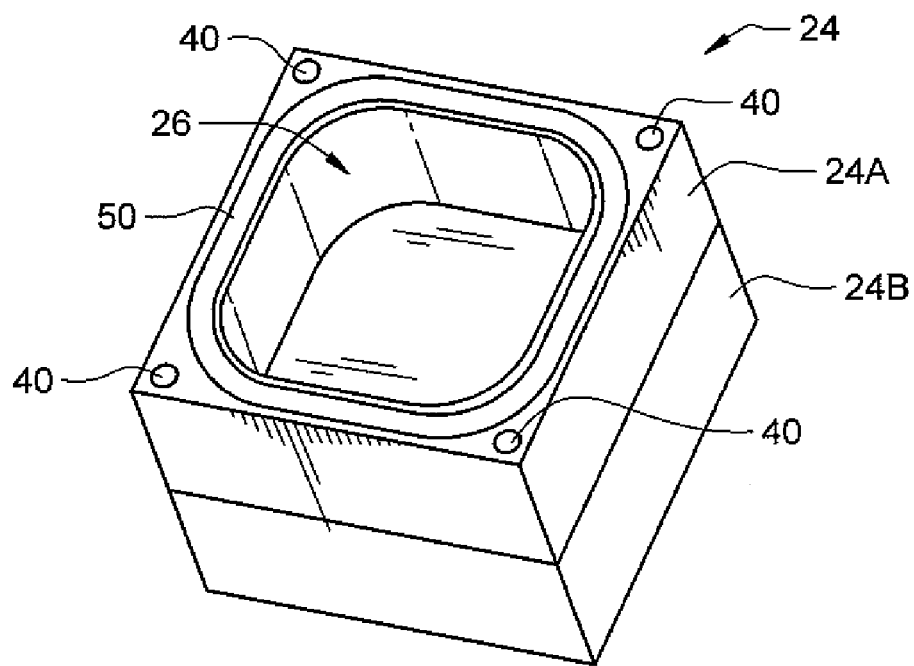
FIG. 4 illustrates a top perspective view of the lid of the optical transceiver module shown in FIG. 2.

FIGS. 3 and 4 illustrate top and bottom perspective views, respectively, of the lid 24. FIG. 3 shows the lens 25 formed in the top surface of the upper lid portion 24B. As shown in FIG. 4, the lower and upper lid portions 24A and 24B have an opening or cavity 26 formed therein to provide space for the components of the transmit side of the transceiver module that are to be enclosed therein. As shown in FIG. 4, the bottom surface of the lower lid portion 24A has spherical solder tacking pads 40 and an annular solder sealing ring 50 disposed thereon. FIG. 4 is shaded to show the physical structures of the pads 40 and sealing ring 50 in accordance with an embodiment. In accordance with this embodiment, the solder tacking pads 40 have a height (i.e., measured as a distance away from and normal to the bottom surface of the lower lid portion 24A) that is greater than the height (measured in the same way) of the solder sealing ring 50. The solder tacking pads 40 and sealing ring 50 are typically placed on the lid 24 at the wafer level, i.e., prior to singulation. The solder tacking pads 40 are spherical in shape and the ring 50 is annular in shape. As will be described below in more detail, the solder tacking pads 40 are used to tack (i.e., temporarily attach) the bottom surface of the lower lid portion 24A to the top surface of the submount assembly 23 to pre-align the lid 24 with the submount assembly 23 and prevent the lid 24 from shifting position until it can be permanently attached to the submount assembly 23.

Figure 5:
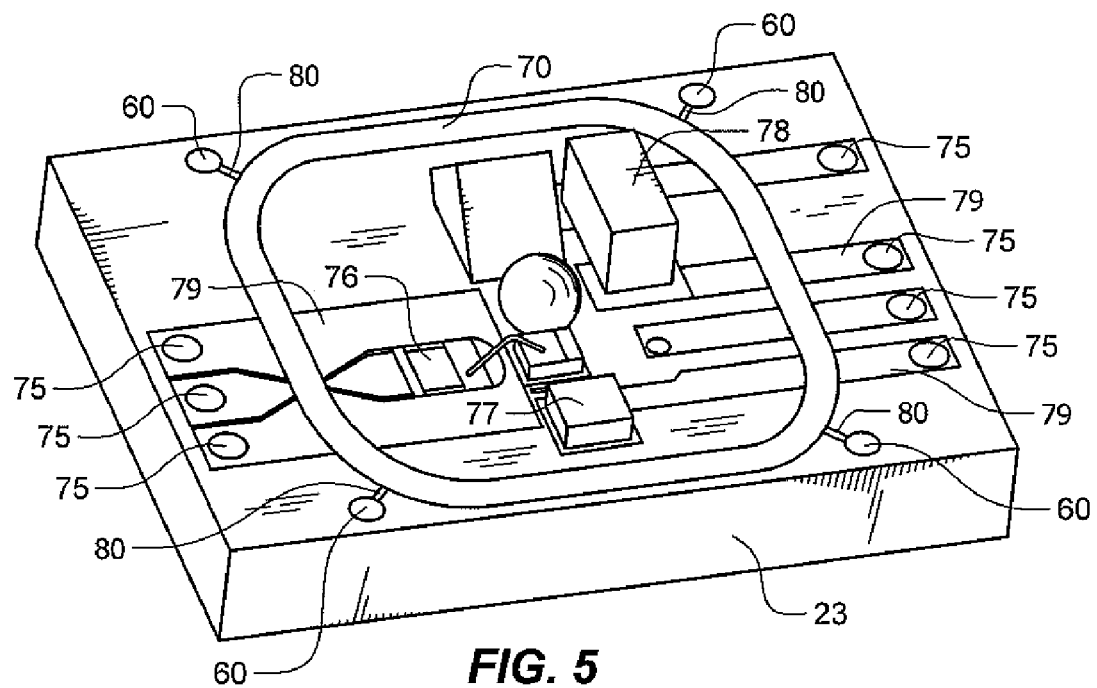
FIG. 5 illustrates a top perspective view of the submount assembly in accordance with an embodiment.

FIG. 5 illustrates a top perspective view of the submount assembly 23 in accordance with an embodiment. The submount assembly 23 has spherical metal tacking pads 60 and an annular metal sealing ring 70 disposed on the top surface thereof. The spherical metal tacking pads 60 and the annular metal sealing ring 70 are typically matched in shape and size to the spherical solder tacking pads 40 and the annular solder sealing ring 50, respectively, disposed on the bottom surface of the lower lid portion 24A (FIG. 4). The metal that is used for the tacking pads 60 and sealing ring 70 may be, for example, titanium-platinum-gold (TiPtAu). Thieving traces 80 preferably are formed in the top surface of the submount assembly 23 between the tacking pads 60 and the sealing ring 70 to provide a pathway for solder to flow between the tacking pads 60 and the sealing ring 70 during the solder flowing process. This prevents excess solder from coming into contact with other components, leads or traces on the submount assembly 23, which could result in short circuits and other problems in the transceiver module 20 that may prevent it from operating properly. In accordance with this embodiment, electrical contact pads 75 are connected to one or more components 76, 77, 78 of the transceiver module via electrically conductive traces 79 that pass beneath and are insulated from the annular metal sealing ring 70.

With reference to FIGS. 4 and 5, when the lid 24 is placed on the submount assembly 23, the tacking pads 40 on the bottom surface of the lower lid portion 24A come into contact with the tacking pads 60 on the top surface of the submount assembly 23. Because the tacking pads 40 and 60 have heights that are greater than the heights of the annular sealing rings 50 and 70, the sealing rings 50 and 70 do not come into contact with each other. However, when the tacking pads 40 and 60 come into contact with each other, the forces exerted on the contact pads 40 by the contact pads 60, and vice versa, cause the contact pads 40 and 60 to partially melt, which results in the tacking pads 40 and 60 temporarily adhering to each other. This temporary adherence, or tacking, of the tacking pads 40 and 60 to each other results in the lid 24 being temporarily attached, or tacked, to the submount assembly 23 in a temporary, pre-alignment position. This temporarily prevents the lid 24 from moving.

Once the lid 24 has been temporarily tacked to the submount assembly 23, the solder flowing process is performed. During the solder flowing process, the populated submount assembly 23 having the lid 24 temporarily tacked thereto is placed in an oven and heated to a temperature that is sufficient to cause the solder tacking pads 40 and the solder sealing ring 50 to melt. When the solder melts, the surface tension of the molten solder pulls the lid 24 into its ultimate, permanently aligned position.

Thus, the hermetic sealing system in accordance with this embodiment includes the temporary attachment/pre-alignment elements 40 and 60 disposed on the bottom surface of the lid 24 and on the top surface of the submount assembly 23, as well as the permanent attachment/alignment elements 50 and 70 disposed on the bottom surface of the lid 24 and on the top surface of the submount assembly 23. It should be noted that the solder tacking pads 40 and the solder annular sealing ring 50 could be disposed on the top surface of the submount assembly 23 instead of on the bottom surface of the lid 24, in which case the metal tacking pads 60 and the metal annular sealing ring 70 would be disposed on the bottom surface of the lid 24. Also, it should be noted that attachment and alignment devices and configurations other than those illustrated in FIG. 5 could be used for this purpose.

Figure 6A:
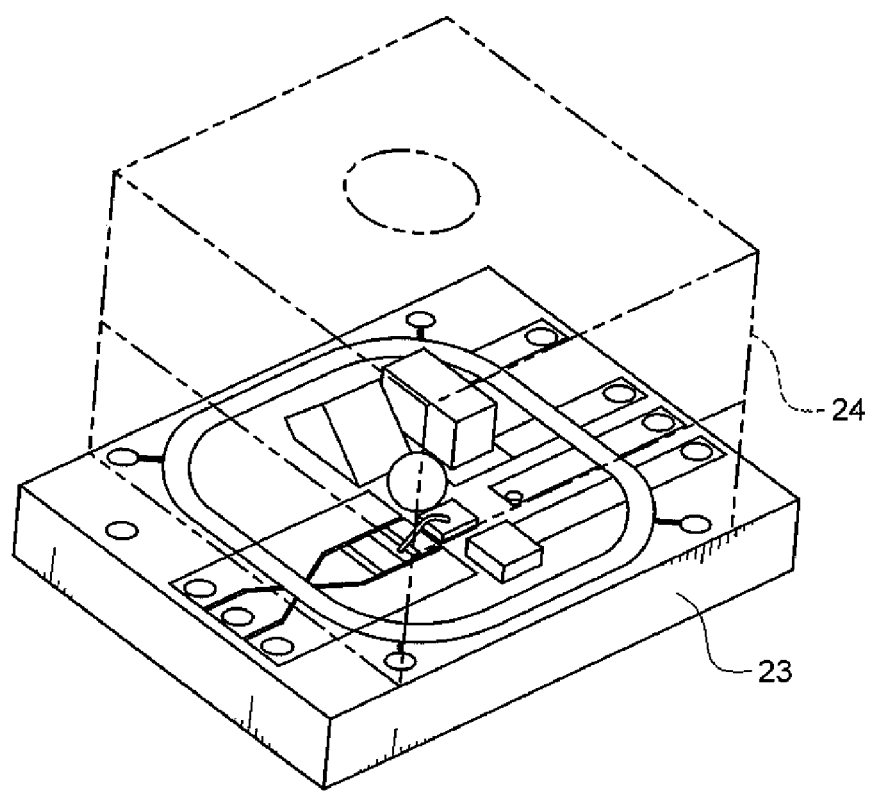
FIG. 6A illustrates a perspective view of the submount assembly shown in FIG. 5 having the lid shown in FIGS. 3 and 4 attached thereto in its permanently aligned position, i.e., after the solder flowing process has been performed.

FIG. 6A illustrates a perspective view of the submount assembly 23 having the lid 24 permanently attached thereto in its permanently aligned position, i.e., after the solder flowing process has been performed and the solder has hardened. As stated above, when the solder flows, the thieving traces 80 (FIG. 5) allow solder to flow between the pads 40, 60 (FIGS. 4 and 5) and the annular sealing rings 50, 70 (FIGS. 4 and 5) and prevent solder from inadvertently coming into contact with components, traces and/or leads on the submount assembly 23.

Figure 6B:
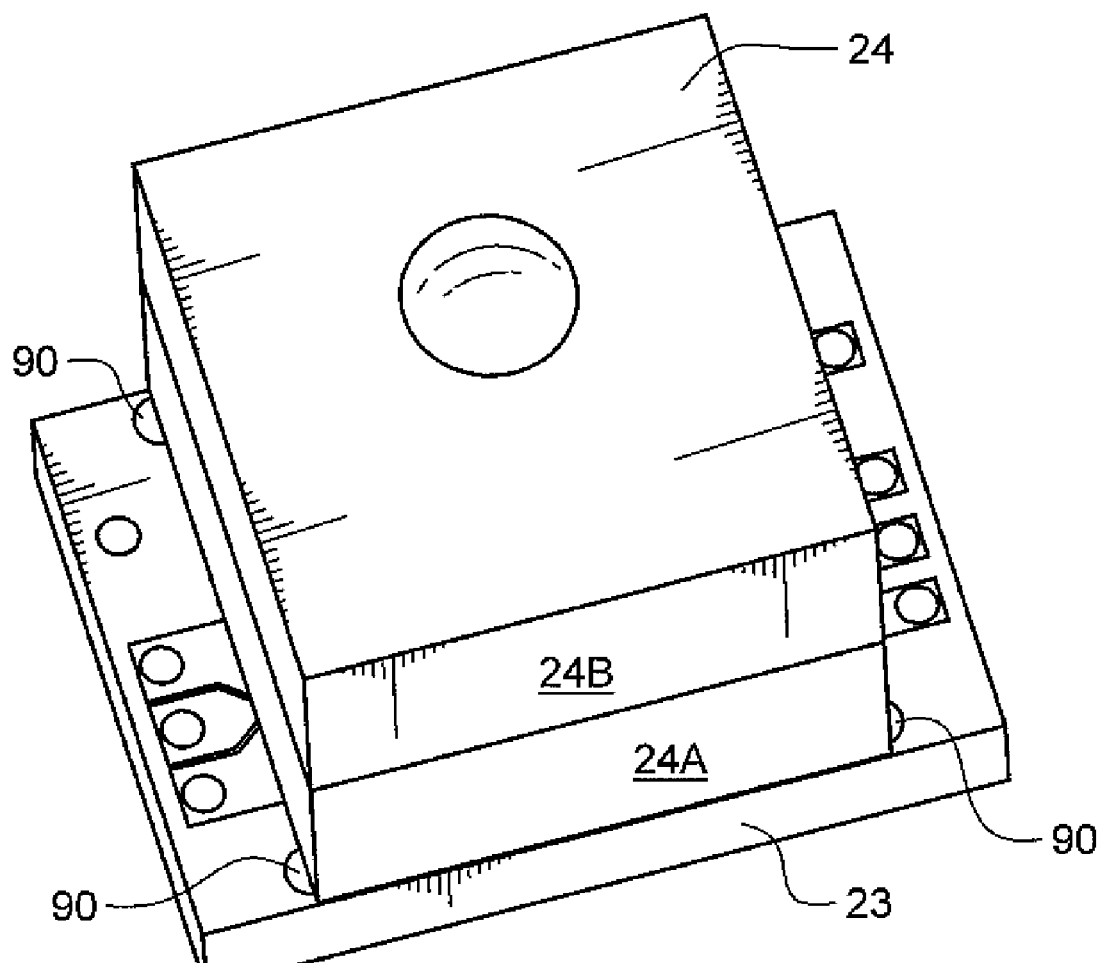
FIG. 6B illustrates a perspective view of the submount assembly shown in FIG. 5 having the lid shown in FIGS. 3 and 4 attached thereto in its permanently aligned position after the solder has been cooled and thereby hardened and after an attachment material such as epoxy has been placed in contact with the lid and the submount assembly.

FIG. 6B illustrates a perspective view of the submount assembly 23 having the lid 24 permanently attached thereto in its permanently aligned position after the solder has been cooled and thereby hardened and after an attachment material 90 such as epoxy, for example, has been placed in contact with the lid 24 and the submount assembly 23. In accordance with an embodiment, the attachment material 90 corresponds to drops of epoxy placed at locations where the corners at the bottom surface of the lower lid portion 24A come into contact with the upper surface of the submount assembly 23. Once the epoxy hardens, it permanently bonds the lid 24 to the submount assembly 23, further ensuring that the lid 24 will not move relative to the submount assembly 23 and that the integrity of the hermetic seal remains high.

Figure 7:
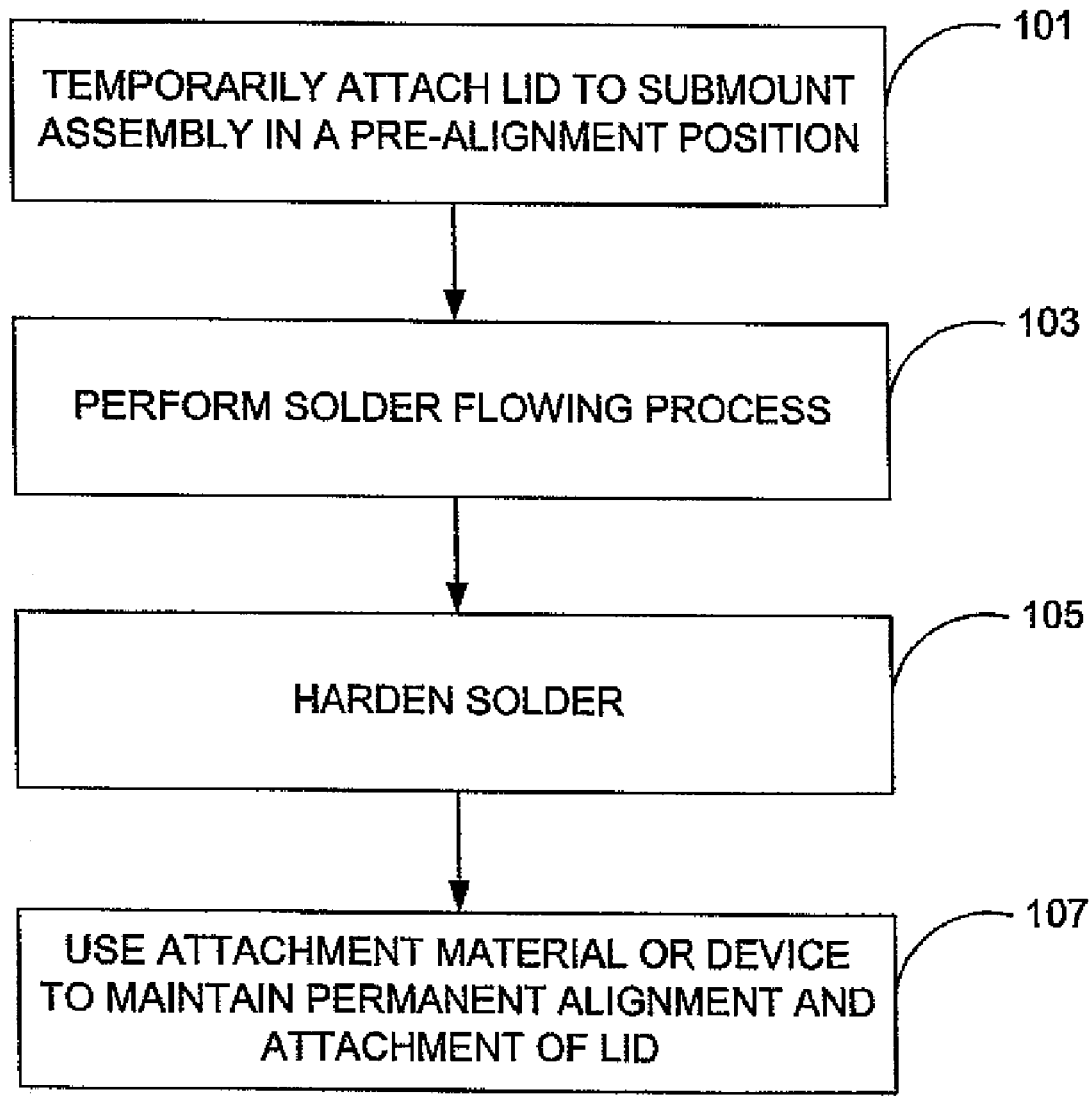
FIG. 7 illustrates a flowchart that represents the method in accordance with an embodiment for creating a hermetically-sealed enclosure in an optical transceiver module.

FIG. 7 illustrates a flowchart that represents the method in accordance with an embodiment for creating a hermetically-sealed enclosure in an optical transceiver module. As described above, a lid is temporarily attached to a submount assembly in a pre-alignment position prior to the solder flowing process being performed, as indicated by block 101. The pre-alignment/attachment step can be performed in a variety of ways, such as by using the tacking pads on the bottom surface of the lower lid portion and on the top surface of the submount assembly as described above with reference to FIGS. 2-6B. Another way to temporarily attach the lid in its pre-alignment position is to provide holes (not shown) in the submount assembly for receiving the spherical solder tacking pads disposed on the bottom surface of the lower lid portion. Since the spherical solder tacking pads disposed on the lower lid portion are greater in height than the height of the annular solder sealing ring disposed on the lower lid portion, the solder tacking pads will be received in the holes, thereby temporarily aligning and attaching the lid. Thus, the invention is not limited to any particular methods or devices for temporarily attaching and pre-aligning the lid.

After the lid has been temporarily attached and pre-aligned, the solder flowing process is performed, as indicated by block 103. As indicated above, when the solder melts, the surface tension of the melted solder pulls the lid into its ultimate, permanently aligned position. The solder is then hardened, as indicated by block 105. This step is typically performed by exposing the solder to ambient air, which cools the solder and causes it to harden. The lid is now hermetically sealed to the submount assembly. As described above, after the solder has hardened, an attachment material or device (e.g., epoxy) is used to ensure that the lid and submount assembly remain permanently aligned and bonded to each other, as indicated by block 107. This latter step is preferred but optional, because the solder bond may be sufficient to maintain the permanent alignment and attachment of the lid to the submount assembly.

With reference again to FIG. 5, the electrical conductors 79 for communicating electrical signals between components within the hermetically-sealed enclosure and components of the transceiver module outside of the enclosure pass underneath the metal annular sealing ring 70. The conductors 79 are electrically isolated from the metal annular sealing ring 70 by a dielectric layer (not shown). The metal annular sealing ring 70 is disposed on top of this dielectric layer, and the lid 24 sits on the ring 70, as described above with reference to FIGS. 6A and 6B. It is well known that because of the patterns that are formed in the metal layer to create the electrical conductors 79 stress singularity points exist in the dielectric layer that separates the conductors 79 from the ring 70 that may produce cracks the dielectric layer. These cracks may result in the hermetic seal failing and other problems.

Figure 8:
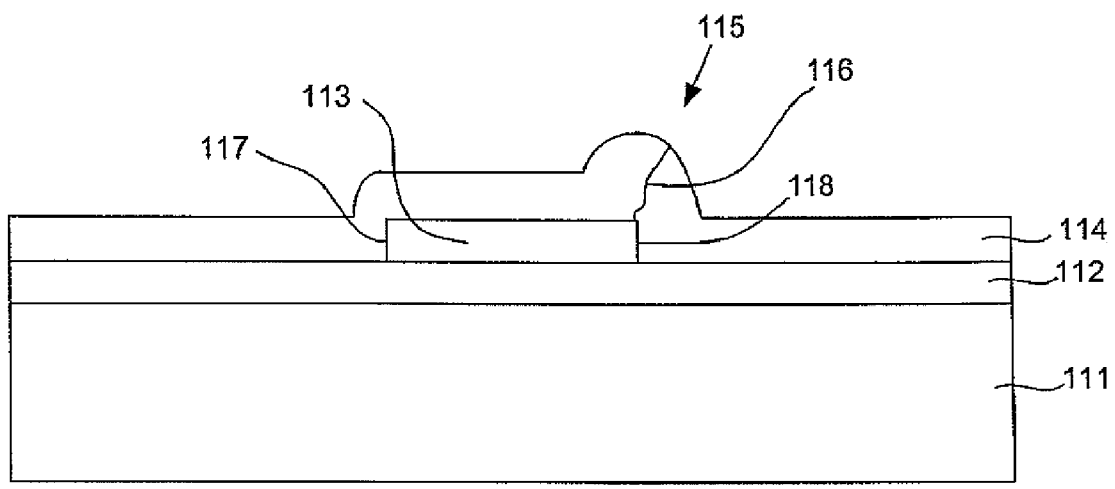
FIG. 8 illustrates a cross-sectional view of a wafer having a first dielectric layer disposed thereon, on which a patterned metal layer that forms the conductors shown in FIG. 5 is disposed.

FIG. 8 illustrates a cross-sectional view of a wafer 111 having a first dielectric layer 112 disposed thereon, on which a patterned metal layer 113 that forms the conductors 79 (FIG. 5) is disposed. The patterned metal layer 113 is covered by a second dielectric layer 114, which is the aforementioned dielectric layer that electrically isolates the conductors 79 from the annular ring 70 (FIG. 5). A stress singularity point at location 115 in the dielectric layer 114 has produced a crack 116 in the dielectric layer 114.

In order to reduce the stress singularity that can produce cracks in the dielectric layer 114, the edges 117 and/or 118 of the patterned metal layer 113 are tapered. U.S. Pat. No. 6,331,678 discloses using ion beam milling to taper edges in a patterned metal layer. While the technique disclosed in that patent may be suitable for use with the invention, that technique is a single-wafer technique that requires a relatively large amount of time to execute. In accordance with an embodiment, a lift-off evaporation process is used to achieve the edge-tapered metal layer, as will now be described with reference to FIGS. 9A-9C.

Figure 9A:
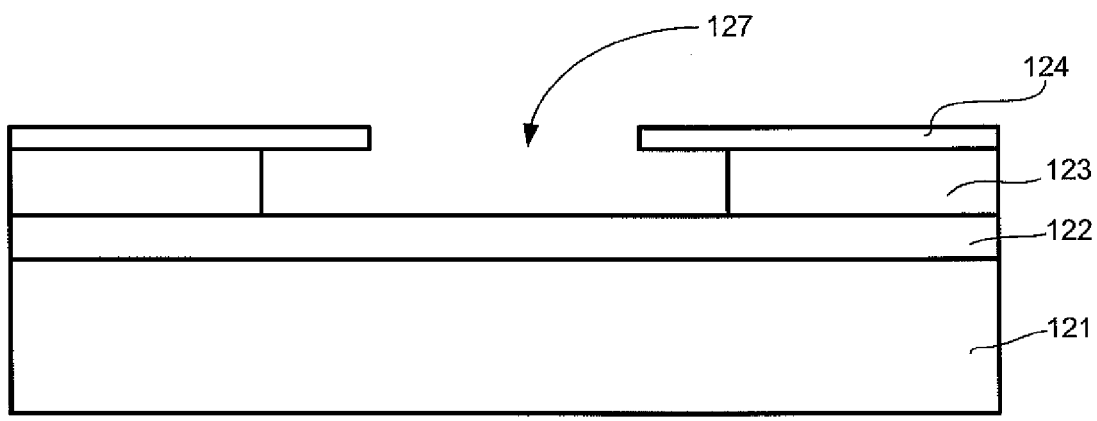
FIGS. 9A-9C illustrate cross-sectional views of a wafer having various layers disposed thereon, which are processed to achieve a metal layer in which edges are tapered to prevent cracks from forming in the dielectric layer.
Figure 9B:
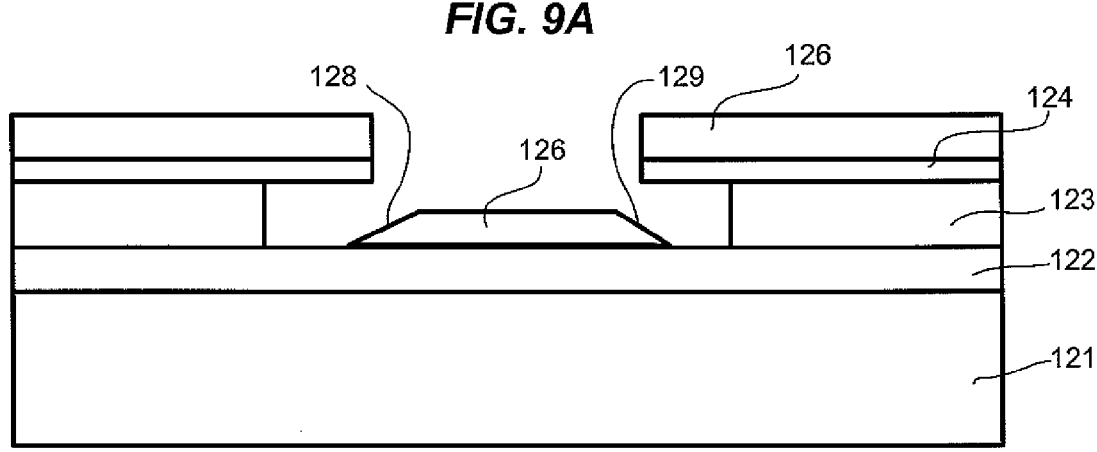
Figure 9C:
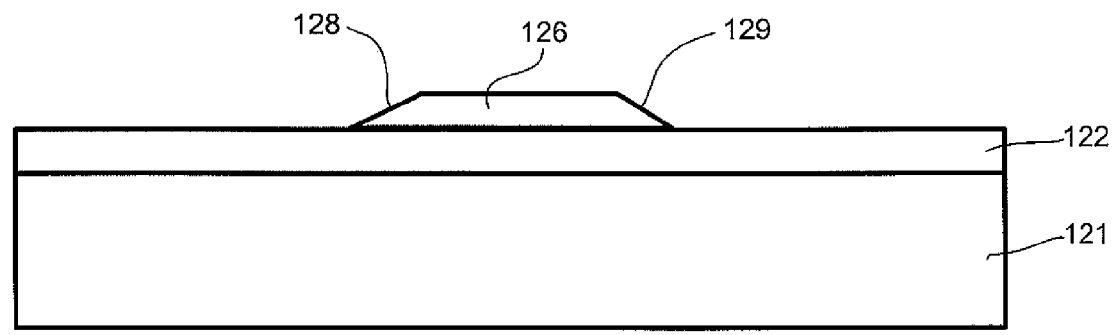

FIGS. 9A-9C illustrate cross-sectional views of a wafer 121 having various layers thereon that are processed to achieve the edge-tapered metal layer. The wafer 121 has a first dielectric layer 122 disposed thereon. The layer 122 has a layer of polyimide 123 disposed thereon that is not photosensitive, but is soluble in photoresist developer. The layer 123 has a photoresist layer 124 thereon that is photosensitive and soluble in photoresist developer. The cross-sectional view shown in FIG. 9A depicts the wafer and layers after the exposure and developing steps have been performed. Upon exposure and developing, the layer 124 will become patterned, as indicated by an opening 127 formed in layer 124. The opening 127 extends through layer 123 because layer 124 also dissolves during the developing step, but with an undercut due to layer 124 continuing to dissolve whereas the overhanging regions of layer 124 that were not exposed do not dissolve. Thus, the layer 124 overhangs the layer 123, as shown in FIG. 9A.

The cross-sectional view illustrated in FIG. 9B depicts the wafer 121 and layers 122-124 after a metal 126 has been deposited in an evaporator. The wafer is rotated in the evaporator during vapor deposition of the metal 126. The overhanging portions of layer 124 cause the edges 128 and 129 of the metal 126 to become tapered during the evaporation step.

The cross-sectional view illustrated in FIG. 9C depicts the wafer 121, the dielectric layer 122 and the tapered metal 126 after the layers 123 and 124 have been removed. After the metal 126 has been tapered, the wafer 121 having layers 123, 124 and 126 thereon is removed from the evaporator and developed with photoresist developer, which removes the layers 123 and 124. When the layer 124 is removed, the metal 126 on top of layer 124 is also removed, leaving only the wafer 121, the dielectric layer 122 and the tapered metal 126. The tapered edges 128 and 129 in the metal layer 126 reduce stress singularity in the dielectric layer that covers the metal layer 126, thereby preventing cracks from occurring in the dielectric layer. This entire process may be performed at the wafer level to enable a large number of submount assemblies to be created simultaneously.

With reference again to FIG. 5, an alternative to passing the electrical conductors 79 underneath the metal annular sealing ring 70 is to provide vias in the wafer in the area that will be within the hermetic enclosure. This will enable electrical signals to be passed through the vias from contacts on the wafer that are outside of the hermetic enclosure to components within the hermetic enclosure, and vice versa. The manner in which this may be accomplished in accordance with one embodiment will now be described with reference to FIGS. 10A-10G.

With reference to FIG. 10A, a wafer 131 is provided that will function as the substrate of the submount assembly. An etching process is then performed to etch holes 132 through the wafer 131, as shown in FIG. 10B. Preferably dry etching is used for this step, although wet etching may instead be used. Wet etching, however, typically requires more space on the wafer, and for high frequency signals, the inside walls of the vias would need to be patterned. This presents some difficulties because the portion of the trace inside of the via will be out of focus and therefore difficult to pattern. For these reasons, it is preferable to use dry etching to etch holes in the wafer 131.

After the holes 132 have been formed, the wafer 131 is subjected to a thermal oxidation process to cover the wafer 131 and the insides of the holes 132 with an oxide layer 133, as shown in FIG. 10C. The wafer 131 having the oxide layer 133 thereon is then subjected to a seed process during which a seed layer 134 is deposited on one side of the wafer 131 by sputtering, as shown in FIG. 10D. A metal plating process is then performed during which metal attaches to the seed layer 134 to form a plate metal layer 135 that fills the vias and seals them from one side of the wafer 131, as shown in FIG. 10E. The wafer 131 is then subjected to a grinding and polishing process that thins and polishes the wafer 131, as indicated in FIG. 10F. The plated metal that is not inside of the holes 132 is then removed, resulting in a wafer that can be processed in the typical manner, as indicated in FIG. 10G.

Metal patterns can be deposited on the processed wafer shown in FIG. 10G to provide electrical connections between components that will be mounted on the submount assembly after the wafer is singulated. For example, metal stacks comprising TiPtAu layers can be put on top of vias 135 and other areas of the wafer that will receive solder later in the process. Finally, solder material such as gold-tin is placed on top of via 135. Deposition of gold-tin solder can be performed via screen printing of a gold-tin solder paste. The art of screen printing, reflow and cleaning to form a solderable surface is well known. The wafer may then be singulated into individual submount assemblies.

It should be noted that the apparatuses and methods have been described with reference to a few illustrative embodiments for the purposes of demonstrating the principles and concepts of the invention and to provide a few examples of the manner in which they may be implemented. The methods and apparatuses are not limited to these embodiments, as will be understood by persons skilled in the art in view of the description provided herein. The methods and apparatuses also are not limited to being used in an optical transceiver module, but may be used in any type of device for any suitable purpose. Also, while certain materials and processes have been described herein as being used to make the hermetically-sealed submount assembly and lid, the invention is not limited to using the materials and processes described herein.

Also, while the optical transceiver module has been described as having particular components for performing particular tasks, the invention is not limited with respect to the components of the transceiver module. Certain components have been described herein merely for illustrative purposes, and the invention is not limited to those components. For example, the optics system described above with reference to FIG. 2 includes a ball lens, a 45° mirror and a lens formed in the top surface of the lid. The invention is not limited to transceiver modules that include this particular type of optics system. Those skilled in the art will understand that modifications may be made to the embodiments described herein and that all such modifications are within the scope of the invention.

What is claimed is:

1. An optical transceiver module comprising:
   a submount assembly having a top surface and a bottom surface, wherein at least one component of the transceiver module is attached to the top surface of the submount assembly;
   a lid having a top surface, a bottom surface, an exterior surface, and an interior surface, the interior surface defining a cavity formed in the lid, the cavity providing space for said at least one component such that when the bottom surface of the lid is attached to the top surface of the submount assembly, said at least one component is enclosed within the cavity formed in the lid;
   a hermetic sealing system including at least one temporary attachment/pre-alignment sealing element disposed on the bottom surface of the lid and at least one permanent attachment/alignment sealing element disposed on the bottom surface of the lid, the hermetic sealing system including at least one temporary attachment/pre-alignment sealing element disposed on the top surface of the submount assembly and at least one permanent attachment/alignment sealing element disposed on the top surface of the submount assembly, the temporary attachment/pre-alignment sealing elements disposed on the bottom surface of the lid and on the top surface of the submount assembly coming into contact with each other during a temporary attachment and pre-alignment process during which the lid is temporarily attached to and pre-aligned with the submount assembly, the permanent attachment/alignment sealing elements disposed on the bottom surface of the lid and on the top surface of the submount assembly coming into contact with each other during a permanent attachment and alignment process during which the lid is permanently aligned with and permanently attached to the submount assembly.

2. The optical transceiver module of claim 1, wherein the temporary attachment/pre-alignment sealing element disposed on the bottom surface of the lid comprises at least one solder tacking pads and at least one solder annular sealing rings, said at least one solder tacking pad having a height that is greater than a height of said at least one solder annular sealing ring.

3. The optical transceiver module of claim 2, wherein the temporary attachment/pre-alignment sealing element disposed on the top surface of the submount assembly comprises at least one metal tacking pad and at least one metal annular sealing rings, said at least one metal tacking pad having a height that is greater than a height of said at least one metal annular sealing ring.

4. The optical transceiver module of claim 1, wherein the temporary attachment/pre-alignment sealing element disposed on the bottom surface of the lid comprises at least one metal tacking pads and at least one metal annular sealing rings, said at least one metal tacking pad having a height that is greater than a height of said at least one metal annular sealing ring.

5. The optical transceiver module of claim 2, wherein the temporary attachment/pre-alignment sealing element disposed on the top surface of the submount assembly comprises at least one solder tacking pad and at least one solder annular sealing rings, said at least one solder tacking pad having a height that is greater than a height of said at least one solder annular sealing ring.

6. A method for hermetically sealing a lid of an optical transceiver module to a submount assembly of the optical transceiver module to provide a hermetically-sealed environment in which at least one component attached to a surface of the submount assembly is contained, the method comprising:
providing a lid, the lid having at least one surface on which one or more elements of a hermetic sealing system are disposed;
providing a submount assembly, the submount assembly having at least one surface on which one or more elements of the hermetic sealing system are disposed;
temporarily attaching the lid to the submount assembly in a pre-alignment position by placing at least one of the elements of the hermetic sealing system disposed on the lid in contact with at least one of the elements of the hermetic sealing system disposed on the submount assembly to temporarily attach the lid to the submount assembly and to pre-align the lid with the submount assembly; and
permanently attaching the lid to the submount assembly in a permanent alignment position such that a hermetic seal is formed between the bottom surface of the lid and the top surface of the submount assembly.

7. The method of claim 6, wherein said one or more elements disposed on the lid include at least one tacking pad and at least one annular sealing ring, and wherein said one or more elements disposed on the submount assembly include at least one tacking pad and at least one annular sealing ring, said at least one tacking pad disposed on the lid coming into contact with and tacking to said at least one tacking pad disposed on the submount assembly to temporarily attach the lid to the submount assembly in the pre-alignment position.

8. The method of claim 7, wherein said at least one tacking pad disposed on the lid comprises solder, and wherein said at least one tacking pad disposed on the submount assembly comprises metal, and wherein when the solder tacking pad on the lid comes into contact with the metal tacking pad on the submount assembly, the solder tacking pad softens causing the softened tacking pad to temporarily tack to the metal tacking pad.

9. The method of claim 8, wherein said at least one annular sealing ring disposed on the lid comprises solder, wherein said at least one annular sealing ring disposed on the submount assembly comprising metal, the solder annular sealing ring having a height that is less than a height of the metal annular sealing ring such that when the solder and metal tacking pads come into contact with each other the solder and metal annular sealing rings are prevented from coming into contact with each other, and wherein permanent attachment of the lid to the submount assembly is effected by heating the solder tacking pads and the solder annular sealing ring to cause the solder to melt and by cooling the solder to cause it to harden, wherein hardening of the solder causes the solder tacking pad to bond to the metal tacking pad and the solder annular sealing ring to bond to the metal annular sealing ring.

10. The method of claim 9, further comprising:
after the lid has been permanently attached to the submount assembly, placing an attachment material in contact with a surface of the lid and with a surface of the submount assembly to prevent or minimize movement of the lid relative to the submount assembly.

11. The method of claim 10, wherein the attachment material is epoxy.

12. A method for preventing cracks from occurring in a dielectric layer of a submount assembly, the method comprising:
placing a first dielectric layer on a submount assembly substrate;
forming a patterned metal layer on the first dielectric layer such that edges of the patterned metal layer are tapered; and
covering the patterned metal layer having tapered edges with a second dielectric layer, wherein the tapered edges of the patterned metal layer prevent cracks from occurring in the second dielectric layer at locations at which the second dielectric layer covers the tapered edges of the patterned metal layer.

13. The method of claim 12, wherein formation of the patterned metal layer having tapered edges is accomplished by:
masking off regions of the first dielectric layer based on a metal pattern to be formed on the first dielectric layer in unmasked regions of the first dielectric layer; and
placing the submount assembly substrate having the first dielectric layer thereon in an evaporator and depositing metal on the first dielectric layer in the evaporator such that metal is deposited on the unmasked regions of the first dielectric layer in a configuration in which edges of the metal layer are tapered.

14. The method of claim 13, wherein masking off regions of the first dielectric layer comprises:
forming a first layer of mask material on top of the first dielectric layer, the first layer of mask material being non-photosensitive and soluble in photoresist developer;

forming a second layer of mask material on top of the first layer of mask material, the second layer of mask material being photosensitive and soluble in photoresist developer;

exposing particular regions of the second layer of mask material to light of a particular wavelength to cause the particular regions of the second layer of mask material to become developed; and placing a photoresist developer in contact with the developed regions of the second layer of mask material, wherein the photoresist developer dissolves the developed regions of the second layer of mask material and regions of the first layer of mask material beneath the developed regions of the second layer of mask material such that the undissolved regions of the second layer of mask material laterally overhang undissolved regions of the first layer of mask material, the overhanging undissolved regions of the second layer of mask material and the undissolved regions of the first layer of mask material together masking off the first dielectric layer to control the pattern formed in the metal layer, and wherein while metal is deposited on the first dielectric layer in the evaporator, the submount assembly substrate having the first dielectric layer thereon is rotated to cause edges of the patterned metal layer to be tapered.

15. A method for providing electrical connections to one or more components of an optical transceiver module that are contained within a hermetically-sealed environment without compromising the integrity of the hermetically-sealed environment, the method comprising:

forming holes in a submount assembly that pass from a bottom surface of the submount assembly through an interior of the submount assembly to a top surface of the submount assembly, the holes in the top surface of the submount assembly being within a hermetically-sealed enclosure;

filling the holes with a conductive material to form respective conductive vias in the respective holes;

on the top surface of the submount assembly, placing a material over each of the holes containing the vias to ensure that the hermetically-sealed enclosure remains hermetically sealed; and making electrical connections between the conductive vias and at least one electrical contact of at least one component attached to the submount assembly and contained within the hermetically-sealed enclosure, wherein the conductive vias are formed in the holes by a plating process by which a plating seed layer is formed in the openings and metal is plated on the seed layer.

16. The method of claim 15, wherein the material that is placed over the holes on the top surface of the submount assembly is solder.

* * * * *